(12) United States Patent
Qiu et al.

(10) Patent No.: US 12,541,531 B2
(45) Date of Patent: Feb. 3, 2026

(54) CONSENSUS METHOD AND APPARATUS FOR BLOCKCHAIN, SERVER AND STORAGE MEDIUM

(71) Applicant: HANGZHOU QULIAN TECHNOLOGY CO., LTD., Hangzhou Zhejiang (CN)

(72) Inventors: Weiwei Qiu, Hangzhou Zhejiang (CN); Wei Li, Hangzhou Zhejiang (CN); Fanglei Huang, Hangzhou Zhejiang (CN); Kejie Zhang, Hangzhou Zhejiang (CN); Hao Duan, Hangzhou Zhejiang (CN)

(73) Assignee: HANGZHOU HYPERCHAIN TECHNOLOGY CO., LTD., Zhejiang (CN)

( * ) Notice: Subject to any disclaimer, the term of this patent is extended or adjusted under 35 U.S.C. 154(b) by 210 days.

(21) Appl. No.: 18/340,102

(22) Filed: Jun. 23, 2023

(65) Prior Publication Data
US 2023/0334930 A1 Oct. 19, 2023

Related U.S. Application Data

(63) Continuation of application No. PCT/CN2021/071152, filed on Jan. 12, 2021.

(30) Foreign Application Priority Data

Dec. 24, 2020 (CN) .......................... 202011548287.3

(51) Int. Cl.
*G06F 16/20* (2019.01)
*G06F 16/27* (2019.01)
*G07C 13/00* (2006.01)

(52) U.S. Cl.
CPC ............. *G06F 16/27* (2019.01); *G07C 13/00* (2013.01)

(58) Field of Classification Search
None
See application file for complete search history.

(56) References Cited

U.S. PATENT DOCUMENTS

| | | | | |
|---|---|---|---|---|
| 11,676,141 | B2* | 6/2023 | Jing | .................. G06Q 20/3827 705/71 |
| 11,706,018 | B2* | 7/2023 | Beynel | .................. G06F 16/273 713/189 |

(Continued)

FOREIGN PATENT DOCUMENTS

| | | |
|---|---|---|
| CN | 109118230 A | 1/2019 |
| CN | 109242685 A | 1/2019 |

(Continued)

OTHER PUBLICATIONS

The International Search Report and Written Opinion both mailed Sep. 2, 2021; PCT/CN2021/071152.

(Continued)

*Primary Examiner* — Jau Shya Meng

(57) ABSTRACT

Provided are a consensus method and apparatus for a blockchain, a server and a storage medium. A checkpoint round is designed without waiting for transaction execution results of all nodes in each consensus round so as to reduce the impact of transaction execution on consensus and improve consensus stability. A newly created block comprises an execution result and status of a preorder block of the blockchain. Only the consistency of the newly created block is verified to avoid wasting memory resources and computing resources. The checkpoint round can be customized to improve the scalability of consensus algorithms.

18 Claims, 4 Drawing Sheets

(56) References Cited

U.S. PATENT DOCUMENTS

| | | |
|---|---|---|
| 2018/0150799 A1 | 5/2018 | Hunt et al. |
| 2018/0189100 A1* | 7/2018 | Nemoto ................ G06F 9/4831 |
| 2020/0073758 A1 | 3/2020 | Natarajan et al. |
| 2020/0364205 A1 | 11/2020 | Novotny et al. |
| 2021/0004777 A1* | 1/2021 | Kim .................... G06F 16/2379 |
| 2021/0067513 A1* | 3/2021 | Hassani ............. H04W 12/009 |
| 2021/0132928 A1* | 5/2021 | Xiao ........................ G06F 8/60 |
| 2021/0135867 A1* | 5/2021 | Zeng .......................... H04L 9/50 |
| 2022/0271957 A1* | 8/2022 | Zamani .............. G06F 16/9027 |
| 2023/0052587 A1* | 2/2023 | Yoon ................... G06F 21/6254 |
| 2024/0013207 A1* | 1/2024 | Jacquet ............... G06Q 20/389 |

FOREIGN PATENT DOCUMENTS

| | | |
|---|---|---|
| CN | 109559120 A | 4/2019 |
| CN | 110727644 A | 1/2020 |
| CN | 111427957 A | 7/2020 |
| WO | 2020/072659 A1 | 4/2020 |

OTHER PUBLICATIONS

Chinese Notice of Allowance issued in corresponding Chinese Patent Application No. 202011548287.3 dated May 11, 2024.

Chinese First Office Action and Search Report in Chinese application No. 202011548287.3, mailed on Nov. 28, 2023.

"A Regulatory Digital Currency Model based on Blockchain" published on Computer Research and Development, Issue No. 10, on Oct. 15, 2018, by Jianyi Zhang, etc.

"A Checkpoint Enabled Scalable Blockchain Architecture for Industrial Internet of Things" published on IEEE Transactions on Industrial Informatics, vol. No. 17, Issue No. 11, on Oct. 21, 2020, by Uzair Javaid etc.

* cited by examiner

CONSENSUS METHOD AND APPARATUS FOR BLOCKCHAIN, SERVER AND STORAGE MEDIUM

CROSS-REFERENCE TO RELATED APPLICATIONS

This application is a continuation of International Application No. PCT/CN2021/071152, filed on Jan. 12, 2021, which claims priority to and the benefit of Chinese Patent Application No. 202011548287.3, filed on Dec. 24, 2020. The disclosures of the aforementioned applications are incorporated herein by reference in their entireties.

TECHNICAL FIELD

The present application relates to the field of blockchain technologies, and more particularly, to a consensus method and apparatus for blockchain, a server, and a storage medium.

BACKGROUND

In a blockchain system, a consistency may be an indispensable important attribute, which includes two consistency attributes: a transaction sequence consistency and a state consistency. In order to ensure the consistency of the blockchain system, it is generally necessary to introduce a consensus algorithm to ensure that all nodes execute the same transaction sequence in a consistent sequence (the transaction sequence consistency). Additionally, it is necessary to introduce an additional state comparison scheme to ensure that execution results of all nodes are consistent (the state consistency).

In a consensus algorithm in the related art, a consensus can be coupled with transaction execution to affect stability of the consensus, and different master nodes in the blockchain can construct different proposal blocks on the basis of the local latest block, thereby causing waste of memory resources. Meanwhile, it is necessary to record contents and the execution results of all blocks in real time, maintain a tree of a large number of historical states, and increase the design complexity of an execution module.

Technical Problems

The present application provides a consensus method for blockchain, which can design a checkpoint round without waiting for transaction execution results of all nodes in each consensus round so as to reduce the impact of transaction execution on the consensus and improve stability of the consensus. A block can be newly created, including an execution result and a state of a previous block of the newly created block of the blockchain, and thus only the consistency of the newly created block may be verified to avoid waste of memory resources and computing resources. The checkpoint round can be flexibly customized to improve scalability of the consensus algorithm.

Technical Solutions

In one aspect, the present application provides a consensus method for blockchain. The blockchain includes a plurality of nodes connected sequentially and is provided with a plurality of consensus rounds at runtime for performing a consensus on a transaction executed on the blockchain. a checkpoint round is included in the plurality of consensus rounds. The plurality of nodes includes a master node and a target node within one of the consensus rounds, where the target node is any node of the plurality of nodes except the master node. A consensus proposal message is generated for a target transaction after the target transaction is executed in the blockchain.

The method includes:
in a first consensus round of the plurality of consensus rounds, the master node receiving a first voting result set generated by the plurality of nodes for the consensus proposal message in a second consensus round, where the second consensus round is a consensus round before the first consensus round;
in the first consensus round, the master node generating a first consensus proposal block for the consensus proposal message, where the consensus proposal message includes the first consensus proposal block, the first voting result set in the second consensus round, and the target transaction;
the master node receiving a first voting result generated by the target node for the consensus proposal message;
the master node determining whether the second consensus round is the checkpoint round according to the first voting result; and
if the second consensus round is the checkpoint round, the master node determining whether the blockchain reaches a consensus on the target transaction according to the first voting result.

In a possible implementation of the present application, the master node determining whether the second consensus round is the checkpoint round according to the first voting result includes:
the master node determining whether a first preset number of first voting results are received by the master node; and
if the first preset number of first voting results are received by the master node, the master node determining whether the second consensus round is the checkpoint round.

In a possible implementation of the present application, the master node determining whether the first preset number of first voting results are received by the master node includes:
if the master node receives first voting results fed back by two-thirds of the nodes including a first voting result transmitted by the master node in the blockchain, the master node determining whether the second consensus round is the checkpoint round.

In a possible implementation of the present application, if the second consensus round is the checkpoint round, the target node generates a transaction execution result corresponding to the target transaction in the second consensus round, the first voting result set generated in the second consensus round includes the transaction execution result, and a plurality of transaction execution results in the first voting result set are generated in the second consensus round.

The master node determining whether the blockchain reaches the consensus on the target transaction according to the first voting result includes:
if the second consensus round is the checkpoint round, the master node determining whether the plurality of transaction execution results in the first voting result set generated in the second consensus round are consistent;
if the transaction execution results of a second preset number of nodes are consistent, the master node generating and aggregating checkpoint information in the first voting result set generated in the second consensus round;

the master node determining whether the transaction execution result generated by the master node according to the target transaction is consistent with the transaction execution results in the first voting result set generated in the second consensus round; and if the transaction execution result generated by the master node according to the target transaction is consistent with the transaction execution results in the first voting result set generated in the second consensus round, determining that the blockchain reaches the consensus for the target transaction.

In a possible implementation of the present application, the master node determining whether the transaction execution result generated by the master node according to the target transaction is consistent with the transaction execution results in the first voting result set generated in the second consensus round includes:

determining whether the transaction execution result generated by the master node itself is consistent with any of the transaction execution results in the first voting result set generated in the second consensus round.

In a possible implementation of the present application, the method further includes:

if the transaction execution result generated by the master node itself is inconsistent with any of the transaction execution results in the first voting result set generated in the second consensus round, the master node waiting for timeout with respect to the consensus; and switching the master node to obtain a new master node, where the new master node reaches a consensus on the target transaction again.

In a possible implementation of the present application, the switching of the master node includes:

numbering the plurality of nodes in the blockchain in an order, where a first node of the nodes in the order is an initial master node; and when the master node needs to be switched, switching the master node sequentially according to the order.

In a possible implementation of the present application, the method further includes: if the second consensus round is not the checkpoint round, the master node re-aggregating a first voting result generated by other node in the first consensus round to generate a second voting result set; and switching the master node to obtain a new master node, where the new master node reaches a consensus for the target transaction again.

In a possible implementation of the present application, the method further includes:

the new master node constructing a second proposal block based on the first proposal block, where the second proposal block includes the second voting result set, the consensus proposal message, and the target transaction.

In another aspect, the present application provides a consensus method for blockchain. The blockchain includes a plurality of nodes connected sequentially and is provided with a plurality of consensus rounds at runtime for performing a consensus on a transaction executed on the blockchain. a checkpoint round is included in the plurality of consensus rounds. The plurality of nodes includes a master node and a target node within one of the consensus rounds, where the target node is any node of the plurality of nodes except the master node. A consensus proposal message is generated for a target transaction after the target transaction is executed in the blockchain.

The method includes: in a first consensus round of the plurality of consensus rounds, the target node receiving the consensus proposal message from the master node, where the consensus proposal message includes a first voting result set generated by the plurality of nodes for the consensus proposal message in a second consensus round and the second consensus round is a consensus round before the first consensus round;

the target node determining whether the first consensus round in which the target node is located is the checkpoint round;

if the first consensus round is the checkpoint round, the target node obtaining a transaction execution result corresponding to the target transaction, where the transaction execution result is encapsulated in the first voting result generated by the target node in the first consensus round; and the target node transmitting the first voting result including the transaction execution result to the master node.

In a possible implementation of the present application, the method further includes: before the target node determining whether the first consensus round in which the target node is located is the checkpoint round, the target node determining whether the consensus proposal message includes checkpoint information; and if the consensus proposal message includes the checkpoint information, the target node determining whether the target node reaches a consensus on the target transaction according to the checkpoint information.

In a possible implementation of the present application, the method further includes:

if the first consensus round is not the checkpoint round, the target node generating and transmitting a first voting result for the consensus proposal message to the master node, where the first voting result does not include a transaction execution result obtained by the target node for the target transaction.

In another aspect, the present application further provides a consensus apparatus for blockchain, which is applied to the blockchain. The blockchain includes a plurality of nodes connected sequentially and is provided with a plurality of consensus rounds at runtime for performing a consensus on a transaction executed on the blockchain. A checkpoint round is included in the plurality of consensus rounds. The plurality of nodes includes a master node and a target node within one of the consensus rounds, where the target node is any node of the plurality of nodes except the master node. A consensus proposal message is generated for a target transaction after the target transaction is executed in the blockchain.

The apparatus includes:

a first receiving module for, in a first consensus round of the plurality of consensus rounds, receiving a first voting result set generated by the plurality of nodes for the consensus proposal message in a second consensus round, where the second consensus round is a consensus round before the first consensus round;

a proposal block generating module for, in the first consensus round, generating a first consensus proposal block for the consensus proposal message, where the consensus proposal message includes the first consensus proposal block, the first voting result set in the second consensus round, and the target transaction;

a second receiving module for receiving a first voting result generated by the target node for the consensus proposal message;

a first determining module for determining whether the second consensus round is the checkpoint round according to the first voting result; and a second determining module for, if the second consensus round is the checkpoint round, determining whether the blockchain reaches a consensus on the target transaction according to the first voting result.

In a possible implementation of the present application, the first determining module is mainly configured for: the master node determining whether a first preset number of first voting results are received by the master node; and if the first preset number of first voting results are received by the master node, the master node determining whether the second consensus round is the checkpoint round.

In a possible implementation of the present application, the second determining unit is mainly configured for: if the second consensus round is the checkpoint round, the master node determining whether the plurality of transaction execution results in the first voting result set generated in the second consensus round are consistent; if the transaction execution results of a second preset number of nodes are consistent, the master node generating and aggregating checkpoint information in the first voting result set generated in the second consensus round; the master node determining whether the transaction execution result generated by the master node according to the target transaction is consistent with the transaction execution results in the first voting result set generated in the second consensus round; and if the transaction execution result generated by the master node according to the target transaction is consistent with the transaction execution results in the first voting result set generated in the second consensus round, determining that the blockchain reaches the consensus on the target transaction.

In another aspect, the present application further provides a consensus apparatus for blockchain, which is applied to the blockchain. The blockchain includes a plurality of nodes connected sequentially and is provided with a plurality of consensus rounds at runtime for performing a consensus on a transaction executed on the blockchain. A checkpoint round is included in the plurality of consensus rounds. The plurality of nodes includes a master node and a target node within one of the consensus rounds, where the target node is any node of the plurality of nodes except the master node. A consensus proposal message is generated for a target transaction after the target transaction is executed in the blockchain.

The apparatus includes:

a third receiving module for, in a first consensus round of the plurality of consensus rounds, receiving a consensus proposal message from the master node, where the consensus proposal message includes a first voting result set generated by the plurality of nodes for the consensus proposal message in a second consensus round and the second consensus round is a consensus round before the first consensus round;

a third determining module for determining whether the first consensus round in which the target node is located is the checkpoint round;

an obtaining module for, if the first consensus round is the checkpoint round, obtaining a transaction execution result corresponding to the target transaction, where the transaction execution result is encapsulated in the first voting result generated by the target node in the first consensus round; and a transmitting module for transmitting the first voting result including the transaction execution result to the master node.

In another aspect, the present application further provides a server, including:
one or more processors;
a memory; and
one or more application programs, where the one or more application programs are stored in the memory and configured to be executed by the processors to implement any of the consensus methods as described above.

In another aspect, the present application further provides a computer readable storage medium having stored thereon a computer program that is loaded by a processor to perform steps of any of the consensus methods as described above.

BENEFICIAL EFFECTS

The present application provides the consensus method for blockchain, which can design the checkpoint round without waiting for transaction execution results of all nodes in each consensus round so as to reduce the impact of transaction execution on the consensus and improve stability of the consensus. A block can be newly created, including an execution result and a state of a previous block of the newly created block of the blockchain, and thus only the consistency of the newly created block may be verified to avoid waste of memory resources and computing resources. The checkpoint round can be flexibly customized to improve scalability of the consensus algorithm.

BRIEF DESCRIPTION OF THE DRAWINGS

In order to more clearly illustrate the technical solutions in embodiments of the present application, the accompanying drawings depicted in the description of the embodiments will be briefly described below. It will be apparent that the accompanying drawings in the following description are merely some embodiments of the present application, and other drawings may be obtained from these drawings without creative effort by those skilled in the art.

DETAILED DESCRIPTION

Figure 1:
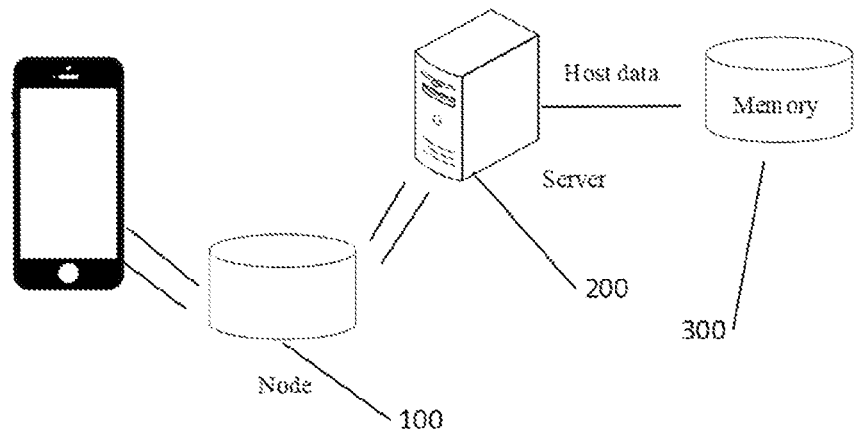
FIG. 1 is a schematic diagram of a scenario of a blockchain system according to an embodiment of the present application.

Technical solutions in embodiments of the present application will be clearly and completely described below in conjunction with drawings in the embodiments of the present application. Obviously, the described embodiments are only a part of embodiments of the present application, rather than all the embodiments. Any ordinarily skilled person in the technical field of the present application could still obtain other accompanying drawings without use laborious invention based on the present accompanying drawings.

In the description of the present application, it should be understood that orientations or position relationships indicated by the terms "center", "longitudinal", "lateral", "length", "width", "thickness", "upper", "lower", "front", "rear", "left", "right", "vertical", "horizontal", "top", "bottom", "inside", "outside" are based on orientations or position relationships illustrated in the drawings. The terms are used to facilitate and simplify the description of the present application, rather than indicate or imply that the devices or elements referred to herein are required to have specific orientations or be constructed or operate in the specific orientations. Accordingly, the terms should not be construed as limiting the present application. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present application, the meaning of "plurality" is two or more, unless otherwise specifically defined.

In the present application, the word "exemplary" is used to mean "serving as an example, illustration, or explanation". Any embodiment described as "exemplary" in the present application is not necessarily construed as being more preferable or advantageous than other embodiments. In order to enable any person skilled in the art to implement and use the present disclosure, the following description is given. In the following description, the details are listed for the purpose of explanation. It should be understood that those of ordinary skill in the art can realize that the present disclosure can also be implemented without using these specific details. In other instances, well-known structures and processes will not be elaborated to avoid unnecessary details to obscure the description of the present disclosure. Therefore, the present application is not intended to be limited to the illustrated embodiments, but is consistent with the widest scope that conforms to the principles and features disclosed in the present application.

Embodiments of the present application provide a consensus method and apparatus for a blockchain, a server and a storage medium, which are described in detail below.

As shown in FIG. 1, which is a schematic diagram of a scenario of a blockchain system according to an embodiment of the present application. The blockchain system may include a plurality of nodes 100, and a server 200. Each of the nodes 100 corresponds to a terminal device and is connected to the server 200 via a network. A consensus apparatus for the blockchain is integrated in the server 200, and the nodes 100 can access the server 200.

In the embodiment of the present application, the server 200 is mainly configured for, in a first consensus round of a plurality of consensus rounds, a master node receiving a first voting result set generated by the plurality of nodes for a consensus proposal message in a second consensus round, where the second consensus round is a consensus round before the first consensus round; in the first consensus round, the master node generating a first consensus proposal block for the consensus proposal message, where the consensus proposal message includes the first consensus proposal block, the first voting result set in the second consensus round, and the target transaction; the master node receiving a first voting result generated by a target node for the consensus proposal message; the master node determining whether the second consensus round is the checkpoint round according to the first voting result; and if the second consensus round is the checkpoint round, the master node determining whether the blockchain reaches a consensus on the target transaction according to the first voting result.

Alternatively, the server 200 is configured for, in a first consensus round of a plurality of consensus rounds, a target node receiving a consensus proposal message from a master node, where the consensus proposal message includes a first voting result set generated by the plurality of nodes for the consensus proposal message in a second consensus round and the second consensus round is a consensus round before the first consensus round; the target node determining whether the first consensus round in which the target node is located is the checkpoint round; if the first consensus round is the checkpoint round, the target node obtaining a transaction execution result corresponding to the target transaction, where the transaction execution result is encapsulated in the first voting result generated by the target node in the first consensus round; and the target node transmitting the first voting result including the transaction execution result to the master node.

In the embodiment of the present application, the server 200 may be a stand-alone server, or may be a server network or a server cluster composed of servers. For example, the server 200 described in the embodiment of the present application includes, but is not limited to, a computer, a network host, a single network server, a plurality of network server clusters, or a cloud server composed of a plurality of servers. The cloud server is composed of a supercomputer based on cloud computing or a network server. In the embodiment of the present application, communication between the server and a node may be accomplished by any communication means, including, but not limited to, mobile communication based on 3rd Generation Partnership Project (3GPP), Long Term Evolution (LTE), Worldwide Interoperability for Microwave Access (WiMAX), or computer network communication based on TCP/IP Protocol Suite (TCP/IP), User Datagram Protocol (UDP), etc.

It should be understood that a terminal device corresponding to the node 100 used in the embodiment of the present application may be a device including both receiving and transmitting hardware, i.e., a device having receiving and transmitting hardware capable of performing bidirectional communication over a bidirectional communication link. Such a terminal device may include a cellular or other communication device having a single-line display or a multi-line display, or a cellular or other communication device without a multi-line display. Specifically, a terminal device corresponding to a specific node 100 may be a desktop terminal or a mobile terminal. Specifically, the terminal device corresponding to the node 100 may be one of a mobile phone, a tablet computer, a notebook computer, or the like.

It should be understood by those skilled in the art that an application environment shown in FIG. 1 is merely an application scenario of the solution of the present application, and does not constitute a limitation on the application scenario of the solution of the present application. Other application environments may also include more or fewer servers than those shown in FIG. 1, or a server network connection relationship. For example, one server and two nodes are shown in FIG. 1. It should be understood that the blockchain system may also include one or more other servers, or/and one or more nodes connected to the server network, which is not specifically limited herein.

In addition, as shown in FIG. 1, the blockchain system may further include a memory 300 for storing data, such as host data, for example, host status data when a terminal device corresponding to a node is running, and the like.

It should be noted that the schematic diagram of the scenario of the blockchain system shown in FIG. 1 is merely an example. The blockchain system and the scenario described in the embodiment of the present application are intended to more clearly illustrate the technical solution of the embodiment of the present application, and do not constitute a limitation on the technical solution provided in the embodiment of the present application. It should be understood by a person skilled in the art that the technical solution provided in the embodiment of the present application is also applicable to similar technical problems with the evolution of the blockchain system and the emergence of a new service scenario.

The blockchain provided in the embodiment of the present application includes a plurality of nodes, which are connected sequentially and can be broadcast to each other. When a transaction is executed in a blockchain, it actually needs to be executed at each node in the blockchain, so it needs to be ensured that the same transaction is executed in a consistent order at the nodes, and the execution results of the transactions at all nodes need to be consistent.

Therefore, in the embodiment of the present application, a consensus needs to be utilized to ensure a consistency of a transaction execution sequence and a consistency of transaction execution results at the nodes. When a transaction is executed in a blockchain, i.e., the blockchain is running, a plurality of consensus rounds may be set to perform a consensus on the transaction executed in the blockchain. A checkpoint round is included among the plurality of consensus rounds, and it is necessary to perform the consensus on the transaction when one of the consensus rounds is the checkpoint round.

It should be noted that the plurality of nodes may be divided into a master node and a slave node in one of the consensus rounds. The master node is generally one in a certain consensus round. Among different consensus rounds, the master nodes may be different. In the embodiment of the present application, each node in the blockchain may be used as the master node, that is, the master node may be classified or changed according to actual requirements.

When performance of a target transaction at each of the nodes in the blockchain is completed, a consensus proposal message can be generated for the target transaction in the node to verify the sequence in which the transaction is executed at each of the nodes and the execution result of the transaction are both consistent.

Figure 2:
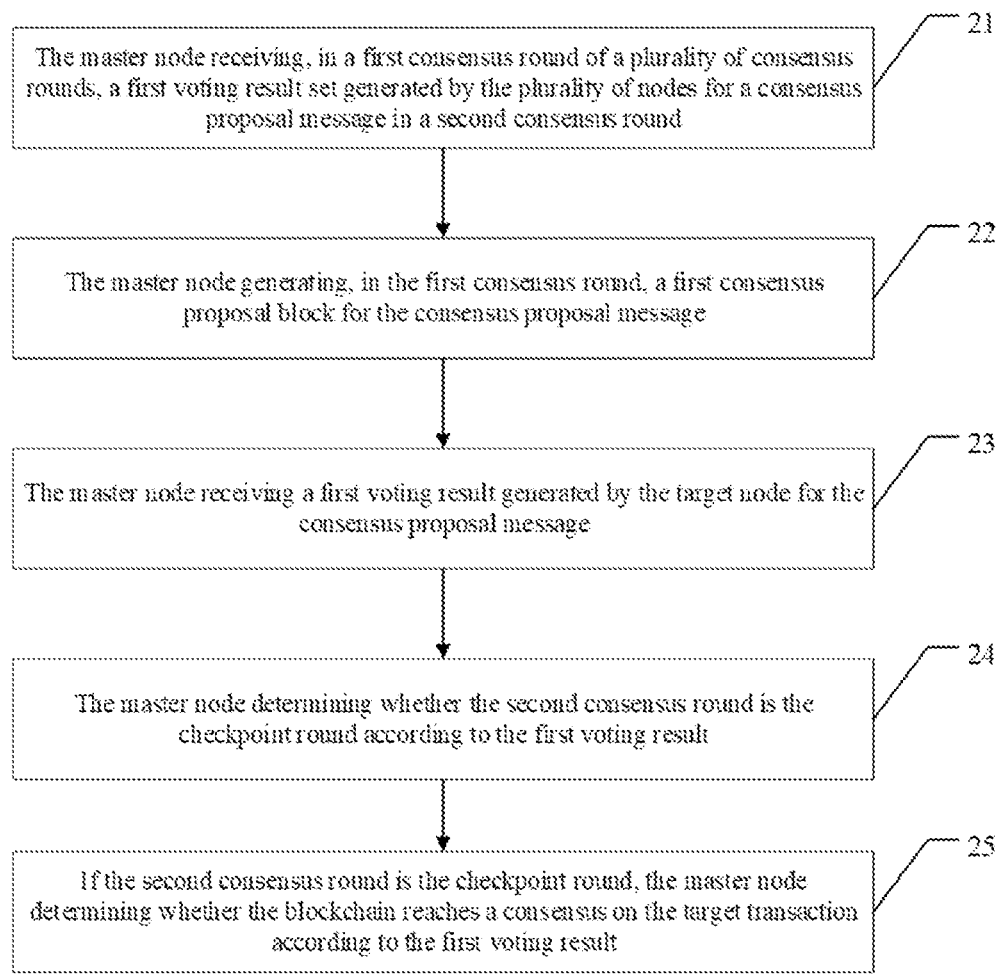
FIG. 2 is a flowchart of a consensus method for blockchain provided in an embodiment of the present application.

As shown in FIG. 2, which is a flowchart of a consensus method for blockchain provided in an embodiment of the present application. The consensus round for blockchain may include steps 21-25.

At step 21, the master node receives, in a first consensus round of a plurality of consensus rounds, a first voting result set generated by the plurality of nodes for a consensus proposal message in a second consensus round.

In the embodiment of the present application, one of the consensus rounds corresponds to a time period. In the consensus round, a consensus may be performed on the execution of the transaction at the node in the current blockchain, i.e., a consensus is performed on the execution sequence of the transaction and the execution result of the transaction.

Since the time at which a transaction is performed at each node is unknown, there may be timeout with respect to a consensus if the consensus is performed in each of the consensus rounds. Therefore, in the embodiment of the present application, it is not necessary to perform a consensus in each of the consensus rounds, and it is only necessary to perform a consensus in a specific checkpoint round.

In the embodiment of the present application, a consensus round corresponds to a time period. A plurality of consensus rounds may be included in an execution process of the blockchain and time is continuous, so the plurality of consensus rounds are also continuous. In each of the consensus rounds, the plurality of nodes may generate a first voting result generated for the consensus proposal message, where the first voting result determines for each of the nodes whether the consensus proposal message can be passed or not. Each of the nodes can also obtain an execution result of a transaction, but only perform a consensus on the execution result of the transaction in a specific checkpoint round and decouple the execution of the transaction from the consensus, thereby preventing the execution of the transaction from affecting the stability of the consensus.

In a first consensus round of the plurality of consensus rounds, the plurality of nodes in the blockchain may be divided into a master node and other nodes, and the master node can, in the first consensus round, receive the first voting result set generated by the plurality of nodes for the consensus proposal message in the second consensus round. The second consensus round is a consensus round before the first consensus round. That is, in the first consensus round, the master node can receive a first voting result set generated by the plurality of nodes for the consensus proposal message in the previous consensus round.

That is, in the embodiment of the present application, after each of the consensus rounds is started, the master node can receive the first voting result set generated in the previous consensus round adjacent to the consensus round.

At step 22, the master node generates, in the first consensus round, a first consensus proposal block for the consensus proposal message.

Specifically, a blockchain is a chain storage structure, where a block is a data element in the chain storage structure. The blockchain is a unidirectional chain structure formed by interconnecting blocks, where the first block is referred to as a genesis block. That is, the blockchain is a chain structure, and a characteristic of the blockchain is that a hash value of a previous block is included in a following block located in the order in the chain structure. The hash value of all the previous blocks on the chain structure may therefore be included in the following block at the end of the chain structure, which ensures that the information of all the previous blocks on the chain structure may be included in the following block at the end of the chain structure. Therefore, only the block at the end of the chain structure can be verified when a consensus is performed. At the same time, the consensus does not affect the execution of transactions in the previous blocks.

In the first consensus round, the node can restart a new consensus. In this case, the master node may newly create a first proposal block for the consensus proposal message on the basis of the current local latest block. Since information in all the previous blocks in the chain structure is included in the following blocks, it is only necessary to verify the newly created first proposal block when a subsequent consensus is performed without verifying all the blocks in the chain structure, so that the consensus efficiency is greatly improved. The consensus of the blockchain is also decoupled from the execution of the transaction.

Since a new consensus needs to be performed, the first consensus proposal block, the first voting result set generated in the second consensus round, and the target transaction may be encapsulated in a consensus proposal message, and broadcast to the target node by using the master node.

When the master node broadcasts the consensus proposal message including the first consensus proposal block, the first voting result set generated in the second consensus round, and the target transaction, it is actually necessary to broadcast the consensus proposal message to all nodes in the blockchain except the master node.

At step 23, the master node receives a first voting result generated by the target node for the consensus proposal message.

After the master node broadcasts the consensus proposal message including the first consensus proposal block, the first voting result set generated in the second consensus round, and the target transaction to a target node, the target node can vote on the consensus proposal message again to obtain the first voting result in the first consensus round, and feed back the first voting result generated by the target node to the master node. That is, the master node can receive the first voting result generated by the target node for the consensus proposal message in the first consensus round.

It should be noted that in the embodiment of the present application, other nodes are all nodes in the blockchain except the master node itself in each of the consensus rounds. Therefore, there are actually a plurality of first voting results received by the master node in each of the consensus rounds.

At step 24, the master node determines whether the second consensus round is the checkpoint round based on the first voting result.

When the master node receives the first voting results of the other nodes, the master node further needs to determine whether the second round is the checkpoint round. That is, the master node needs to determine whether a previous consensus round before the consensus round is the checkpoint round or not.

At step 25, if the second consensus round is the checkpoint round, the master node determines whether the blockchain reaches a consensus on the target transaction according to the first voting result.

In the embodiment of the present application, a plurality of consensus rounds are set in a transaction execution process. Only when the blockchain is located in the checkpoint round, can it be determined whether a consensus has been reached on the target transaction in the next consensus round of the checkpoint round instead of each of the consensus rounds.

The present application provides the consensus method for blockchain, which can design the checkpoint round without waiting for transaction execution results of all nodes in each consensus round so as to reduce the impact of transaction execution on the consensus and improve stability of the consensus. A block can be newly created, including an execution result and a state of a previous block of the newly created block of the blockchain, and thus only the consistency of the newly created block may be verified to avoid waste of memory resources and computing resources. The checkpoint round can be flexibly customized to improve scalability of the consensus algorithm.

In the embodiment of the present application, the master node determining whether the second consensus round is the checkpoint round according to the first voting result may include:
the master node determining whether a first preset number of first voting results are received by the master node; and if the first preset number of first voting results are received by the master node, the master node determining whether the second consensus round is the checkpoint round.

Specifically, in the process in which the nodes vote on the consensus proposal message, the time required for each node to vote is different, so that the nodes send the generated first voting results to the master node in a sequential order. In the process in which the master node receives the first voting result of the target node in the first consensus round, the master node can monitor the number of the first voting results received by the master node at any time. If the master node receives a first preset number of first voting results in the first consensus round, the master node does not need to determine first voting results that have not been received and can directly determine whether the previous consensus round, i.e., the second consensus round, is the checkpoint round. That is, in the embodiment of the present application, as long as the master node receives the first preset number of first voting results, the master node may start to determine whether the previous consensus round is the checkpoint round.

In some embodiments of the present application, the first preset number may be two-thirds of the nodes. That is, if the master node receives the first voting results fed back by two-thirds of the nodes in the blockchain including a first voting result transmitted by the master node, the master node may determine whether the second consensus round is the checkpoint round. In other embodiments of the present application, the first preset number may be another number of nodes, for example, more than one-half of the nodes, or four-fifths of the nodes and the like, and the first preset number may be set according to an actual situation of the blockchain, which is not limited herein.

In the embodiment of the present application, the plurality of consensus rounds are consecutive, and the checkpoint round can be customized. That is, any consensus round of the plurality of consecutive consensus rounds can be designated as the checkpoint round. However, a rule corresponding to the checkpoint round may be generally set in an actual blockchain in order to facilitate a time for determining the consensus. For example, ten consensus rounds may be taken as one cycle, i.e., the tenth consensus round of each adjacent and consecutive ten consensus rounds may be taken as the checkpoint round. When the consensus round is cycled to the checkpoint round, the master node may perform a consensus on the target transaction at a next consensus round after the checkpoint round.

The rule corresponding to the checkpoint round has been generally configured when the blockchain is running. The rule is broadcast to each of the nodes in the blockchain, so that the node can determine whether the current consensus round is the checkpoint round. When the blockchain starts to run, one of the consensus rounds starts to run, so as to determine whether the consensus is reached on the target transaction in the consensus round.

In the embodiment of the present application, if the node in the blockchain is in the checkpoint round, the node generates a hash value of the execution result of the target transaction while generating the first voting result for the consensus proposal message, and transmits the first voting result and the hash value of the execution result of the target transaction to the master node together. However, if the node in the blockchain is not in the checkpoint round, the node can only generate the first voting result for the consensus proposal message without waiting for generation of the execution result of the target transaction, and only transmit the first voting result to the master node.

Therefore, in the embodiment of the present application, only when the previous consensus round is the checkpoint round, the consensus can be performed on the execution result of the target transaction in the next consensus round. There is no need to wait for the execution result of the target transaction at each of all nodes in each of the consensus rounds, thereby avoiding wasting time and affecting the consensus.

In some embodiments of the present application, if the second consensus round is the checkpoint round, the target node may generate a first voting result and an execution result of a target transaction in the second consensus round, i.e., a hash value of the execution result of the target transaction. and the hash value of the execution result of the target transaction is encapsulated in the first voting result and transmitted to the master node along with the first vote result. Meanwhile, after receiving the first voting results from the target node, the master node may aggregate the first voting results to form a first voting result set. The first voting result set includes a plurality of first voting results, and each of the first voting results includes a hash value of an execution result of a transaction.

Figure 3:
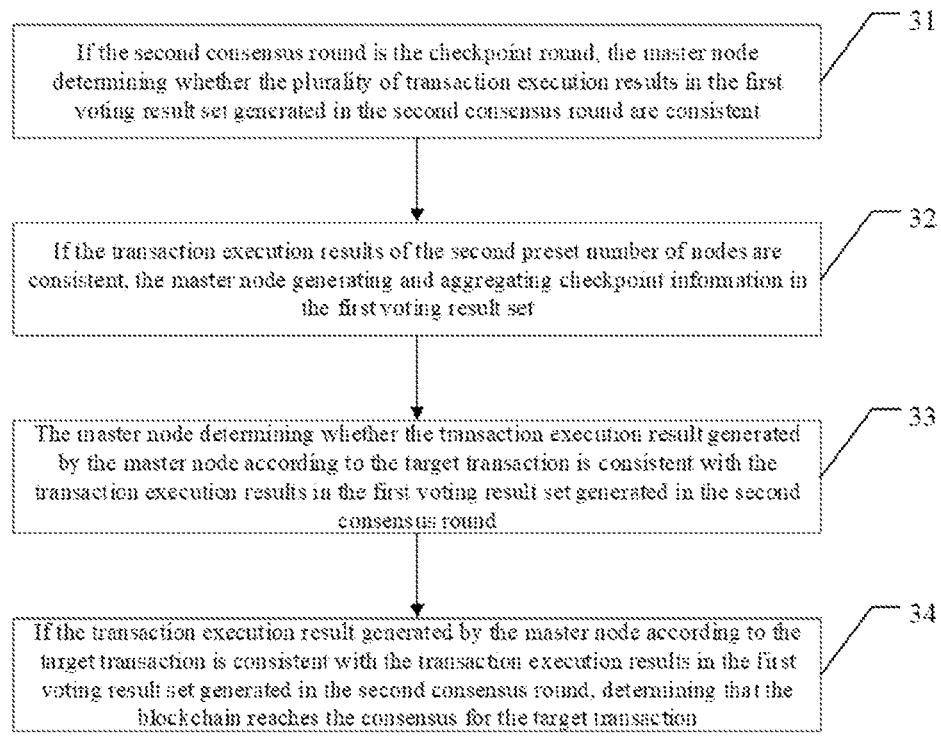
FIG. 3 is a flowchart of a master node determining whether a consensus is reached on a target transaction according to an embodiment of the present application.

As shown in FIG. 3, which is a flowchart of a master node determining whether a consensus is reached on a target transaction according to an embodiment of the present application. The master node determining whether the consensus is reached on the target transaction can include steps 31-34.

At step 31, if the second consensus round is the checkpoint round, the master node determines whether the plurality of transaction execution results in the first voting result set generated in the second consensus round are consistent.

Specifically, since each of the nodes in the blockchain can determine whether the current consensus round in which the node is located is the checkpoint round, the node generates a first voting result for the consensus proposal message and a transaction execution result for the target transaction in the second consensus round if the second consensus round is the checkpoint round. When the master node is located in the first consensus round, the master node can receive the first voting result set including the transaction execution result and generated in the second consensus round, and can determine whether a consensus is reached on the target transaction according to the first voting result set including the transaction execution result.

Specifically, the master node can first determine whether the transaction execution results received in the first voting result set are consistent, that is, determine whether the hash values of the transaction execution results generated by the target node in the second consensus round are consistent. If hash values of transaction execution results of the second preset number of nodes are consistent, the master node may generate and aggregate checkpoint information in the first voting result set. That is, the first voting result set includes not only the Checkpoint information, but also the hash values of the transaction execution results of the target node as well as the plurality of first voting results.

In some embodiments of the present application, the second preset number may be two-thirds of the nodes. That is, if the master node determines that the hash values of the execution results of the target transaction of at least two-thirds of the nodes are consistent, the master node may consider that the execution results of the target transactions at all other nodes are consistent.

It should be noted that, in the above-described embodiment, whether the plurality of transaction execution results in the first voting result set are consistent is actually determined by sequentially determining whether the hash values of the plurality of transaction execution results in the first voting result set are consistent. If at least two thirds of the transaction execution results are consistent, it can be considered that the consistency of the transaction is reached among all other nodes. That is, the consensus is reached.

In the above-described embodiment, the second preset number may also be other number besides the two-thirds of the nodes, such as one-half of the nodes, or four-fifths of the nodes. The specific value of the second preset number may be set according to the actual situation of the blockchain, and is not limited herein.

At step 32, if the transaction execution results of the second preset number of nodes are consistent, the master node generates and aggregates checkpoint information in the first voting result set.

When the master node detected that the transaction execution results of the second preset number of nodes are consistent, the master node can generate checkpoint information, where the checkpoint information may indicate that the transaction execution results of other nodes except the master node are consistent in the previous consensus round, that is, the second consensus round.

At step 33, the master node determines whether the transaction execution result generated by the master node according to the target transaction is consistent with the transaction execution results in the first voting result set generated in the second consensus round.

In the above-described embodiment, after the master node determines that the other nodes reach a consensus on the target transaction, the master node further needs to determine the master node and the other nodes reach the consensus on the target transaction, so that it can be considered that all nodes on the entire blockchain reach the consensus on the target transaction.

Therefore, the master node further needs to determine whether the transaction execution result generated by the master node according to the target transaction is consistent with the transaction execution results in the first voting result set generated in the second consensus round. Since the transaction execution results in the first voting result set generated in the second consensus round are consistent, the master node determines whether the transaction execution result generated by the master node is consistent with the transaction execution results in the first vote result set generated in the second consensus round. In fact, it is only necessary to determine whether the transaction execution result generated by the master node is consistent with any one of the transaction execution results in the first voting result set generated in the second consensus round.

At step 34, if the transaction execution result generated by the master node according to the target transaction is consistent with the transaction execution results in the first voting result set generated in the second consensus round, it is determined that the blockchain reaches the consensus for the target transaction.

In the embodiment of the present application, if the master node determines that the transaction execution result generated by the master node is consistent with the transaction execution results in the first voting result set generated in the second consensus round, it may be determined that the master node and the target node reach the consensus on the target transaction. Since the target node may be any node other than the master node in the plurality of nodes, it may be considered that the plurality of nodes in the blockchain reach a consistency on the target transaction, thereby achieving the consensus. That is, the target transactions are executed in a consistent order at all nodes of the blockchain, and the execution results of the target transactions are consistent, thereby achieving transaction sequence consistency and state consistency.

In the above-described embodiment, if the transaction execution result generated by the master node itself is inconsistent with the transaction execution results in the first voting result set generated in the second consensus round, it can be confirmed that there is no consensus between the master node and the target node. In this case, the master node waits for timeout with respect to the consensus. Meanwhile, in the embodiment of the present application, the master node may be re-switched to obtain a new master node, where the new master node may reach a consensus on the target transaction again.

In yet other embodiments of the present application, if the second consensus round is not the checkpoint round, the master node needs to re-aggregate first voting results generated in the first consensus round to generate a second voting result set. In this case, the generated second voting result set is obtained by aggregation of the first voting resulting in the first consensus round. Meanwhile, the master node can be also re-switched to obtain a new master node, where the new master node can reach a consensus on the target transaction again.

Specifically, the determination of the consensus by the switched new master node has entered the next consensus round, i.e., the third consensus round, where the third consensus round is a following consensus round adjacent to the first consensus round. The switched new master node may reconstruct a second consensus proposal block on the basis of the local latest block (i.e., including the first consensus proposal block), and in this case, the new master node includes the second voting result set generated in the first consensus round by the previous master node (i.e., the master node in the first consensus round). Due to the characteristics of the blockchain, the second proposal block includes the second voting result set generated in the first consensus round by the previous master node (i.e., the master node in the first consensus round).

In the above-described embodiment, the second proposal block further needs to be encapsulated in the consensus proposal message along with the second voting result set generated in the first consensus round and the target transaction. The master node in the third consensus round broadcasts a consensus proposal message including the second voting result set to the target node, and restarts to reach a consensus in the third consensus round.

It should be noted in the embodiment of the present application that there is only one master node in one consensus round, but each of all nodes in the blockchain can be used as the master node. Therefore, the master node can be switched in different consensus rounds. In some embodiments of the present application, the method of switching the master node may be: numbering the plurality of nodes in the blockchain in an order, where a first node of the nodes in the order is an initial master node; and when the master node needs to be switched, switching the master node sequentially according to the order.

Another embodiments of the present application further provides a consensus method for blockchain, where the blockchain includes a plurality of nodes, which are connected sequentially. When a blockchain is run, a plurality of consensus rounds are provided for performing a consensus on transactions executed on the blockchain to ensure execution sequence consistency and execution result consistency of the transactions at different nodes in the blockchain.

The checkpoint round is included in the plurality of consensus rounds. In one consensus round, the plurality of nodes in the blockchain include a master node and a target node. The target node is also any node of the plurality of nodes except the master node. The target transaction generates a consensus proposal message for the target transaction after the blockchain is executed, so as to reach a consensus on the target transaction.

Figure 4:
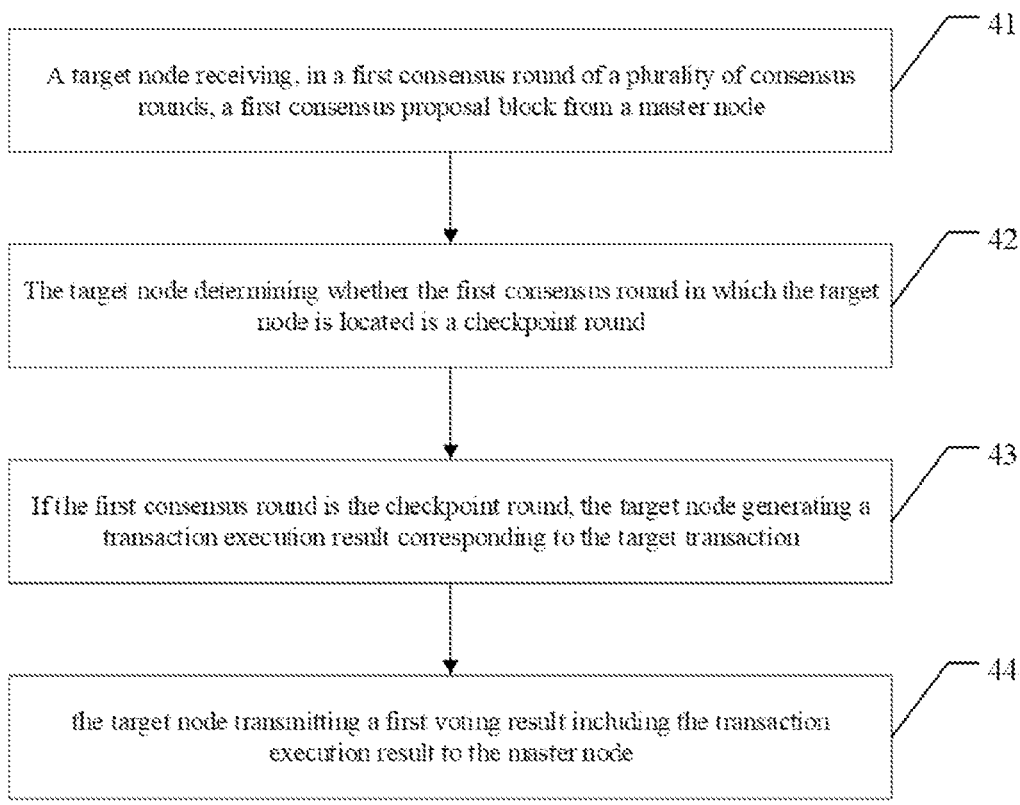
FIG. 4 is a flowchart of another consensus method for blockchain provided in another embodiment of the present application.

As shown in FIG. 4, which is a flowchart of another consensus method for blockchain provided in another embodiment of the present application. The consensus method for blockchain can include steps 41-44.

At step 41, a target node receives, in a first consensus round of a plurality of consensus rounds, a first consensus proposal block from a master node.

In the embodiment of the present application, the target node can receive the first consensus proposal block from the master node in each of the consensus rounds. The first consensus proposal block may include a consensus proposal message for the target transaction, and the target node may be any node of the plurality of nodes in the blockchain except the master node.

At step 42, the target node determines whether the first consensus round in which the target node is located is a checkpoint round.

After receiving the first consensus proposal block transmitted by the master node, the target node further needs to determine whether the target node is in a specific checkpoint round. That is, the target node needs to determine whether the first consensus round in which the target node is currently located is a specific checkpoint round.

At step 43, if the first consensus round is the checkpoint round, the target node generates a transaction execution result corresponding to the target transaction.

In the embodiment of the present application, if the target node itself is in the specific checkpoint round, the target node needs to wait until the round ends, and the latest block in the blockchain generates a transaction execution result for the target transaction. That is, the transaction execution result for the target transaction can be generated for the first consensus proposal block.

At step 44, the target node transmits a first voting result including the transaction execution result to the master node.

The present application provides the consensus method for blockchain. By designing the checkpoint round, transaction execution results of all nodes are obtained only in the checkpoint round, and it is not necessary to wait for transaction execution results of all nodes in each of the consensus rounds so as to reduce the impact of transaction execution on the consensus and improve stability of the consensus. The checkpoint round can be flexibly customized to improve scalability of the consensus algorithm.

In the embodiment of the present application, each of the nodes in the blockchain may determine whether the consensus round in which the node is located is the checkpoint round, where the checkpoint round is usually set in advance. For example, ten consensus rounds may be taken as one cycle, i.e., the tenth consensus round of each adjacent and consecutive ten consensus rounds may be taken as the checkpoint round. When the target node is in a preset checkpoint round, it is necessary to wait for the node to generate a transaction execution result for the target transaction.

Therefore, if the target node determined that the first consensus round in which the target node is located is not a preset checkpoint round, the target node may directly vote to the master node in the current consensus round. That is, the target node can directly generate the first voting result for the consensus proposal message and feedback it to the master node in the first consensus round.

In the embodiment of the present application, the first consensus proposal block may further include a first voting result set generated by the target node for the consensus proposal message in a second consensus round, where the second consensus round is a consensus round before the first consensus round in the plurality of consensus rounds.

The method can further include: before the target node determines whether the first consensus round in which the target node is located is the checkpoint round,
the target node determining whether the consensus proposal message includes the checkpoint information; and if the consensus proposal message includes the checkpoint information, the target node determining whether the target node reaches a consensus on the target transaction according to the checkpoint information.

Specifically, in the embodiment of the present application, the consensus proposal message includes a first voting result set generated by the plurality of nodes in the second consensus round, and the target node may determine whether the transaction execution result generated by the target node is the same as the transaction execution result in the first voting result set in the consensus proposal message, so as to determine whether the target node has reached the consensus on the target transaction.

In the above-described embodiment, if the consensus proposal message received by the target node includes the checkpoint information, it can be determined that there is a consensus on the transaction execution result between at least a second preset number of nodes in the previous consensus round. That is, the transaction execution result between at least the second preset number of nodes realizes the transaction sequence consistency and the state consistency.

Since the transaction result consistency is achieved between at least the second preset number of transaction execution results in the first voting result set, that is, the plurality of transaction execution results are consistent, it is only necessary to determine whether the transaction execution result generated by the target node is same as any of the transaction execution results in the first voting result set when the target node determines whether the target node achieves the consistency of the transaction. In the embodiment of the present application, whether the transaction execution results are consistent is actually determined by determining whether the hash values of the transaction execution results are consistent.

In the above embodiment, if it is determined that the execution result of the target node is consistent with the transaction execution results in the first voting result set, it can be determined that the consistency is reached between a local execution blockchain state of the target node and the first consensus proposal block. Also, since the first consensus proposal block includes hash values of all previous blocks located in the first consensus proposal block, it can be considered that a local execution chain block state of the target node is consistent with the entire network.

If the target node does not achieve the consistency of the transaction, the target node may refuse to generate the first voting result and wait for timeout with respect to the consensus. Finally, the master node is finally switched to obtain a new master node, and the regenerated new master node restarts to perform a consensus on the consensus proposal message.

In yet other embodiments of the present application, if the first voting result set in the first consensus proposal block received by the target node does not include checkpoint information, the target node needs to determine whether the target node itself is in the specific checkpoint round. If the target node is in the specific checkpoint round, the target node needs to wait for the transaction execution results in the proposal block newly generated before the end of the consensus round, regenerates the first voting result for the consensus proposal message, and transmits the first voting result including the transaction execution results to the master node.

In yet other embodiments of the present application, if the first consensus round is not the checkpoint round, that is, the consensus round in which the target node is currently located is not the checkpoint round, the target node may directly generate and transmit the first voting result to the master node in the current consensus round, where the first voting result does not include the transaction execution results generated by the target node.

Figure 5:
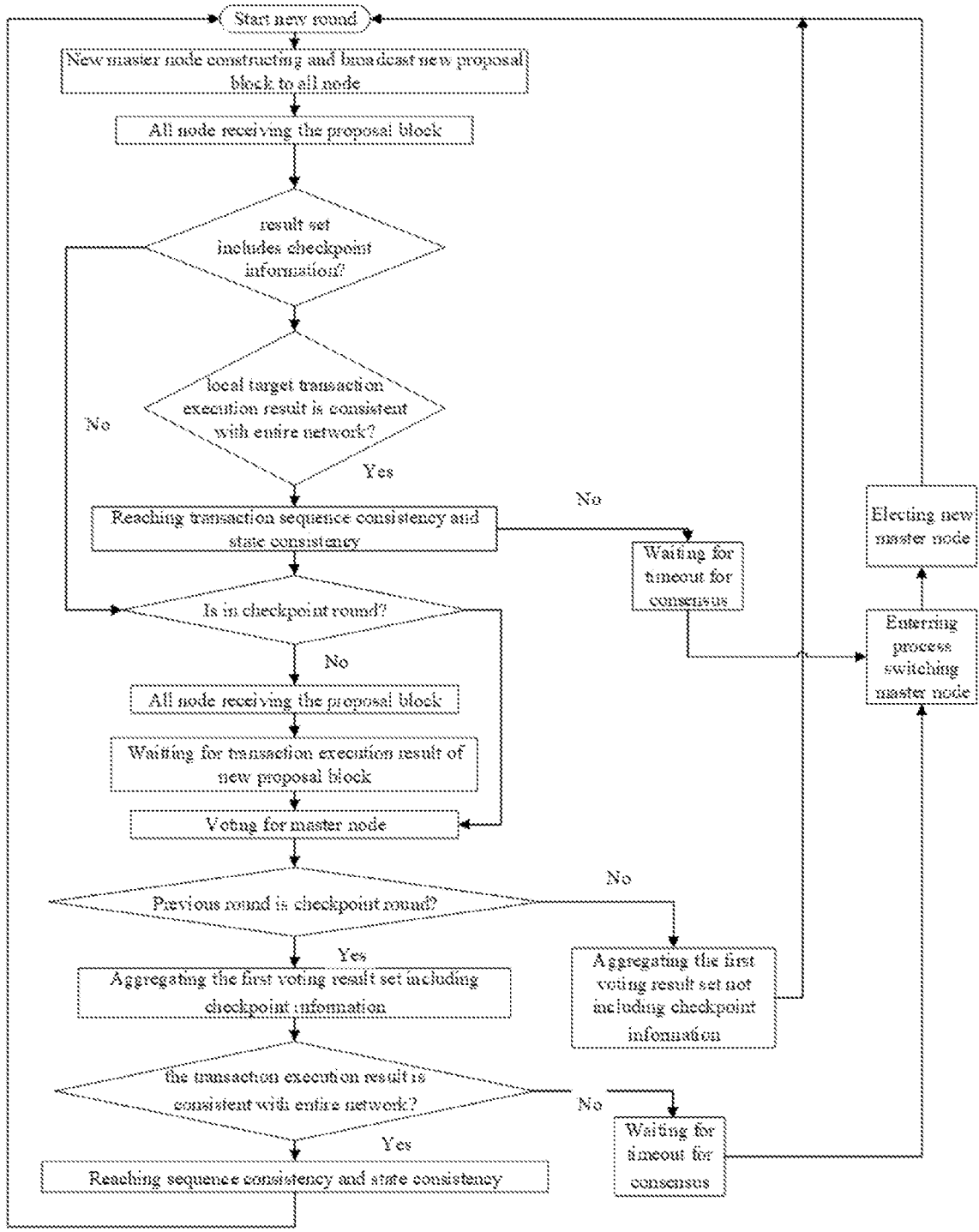
FIG. 5 is a flowchart of a consensus method for blockchain provided in a specific embodiment of the present application.

As shown in FIG. 5, which is a flowchart of a consensus method for blockchain provided in a specific embodiment of the present application. As shown in FIG. 5, when the transaction execution is completed and a new consensus round is started, a plurality of nodes of the blockchain in the current consensus round are classified into a master node and a target node, and the target node may be any node of the plurality of nodes except the master node.

The master node can reconstruct a first proposal block on the basis of the latest local block before transmitting the consensus proposal message in each of the consensus rounds. Due to the characteristics of the blockchain, the newly constructed first proposal block includes information in all blocks before the first proposal block. Therefore, in a subsequent consensus process, only the information in the first consensus proposal block needs to be verified.

In FIG. 5, when construction of the first consensus proposal block is completed, the consensus proposal message is encapsulated with the first consensus proposal block, the first voting result set generated in the previous consensus round, and the target transaction, and broadcast to the target node. The nodes in the blockchain generate first voting results for the consensus proposal message in each of the consensus rounds. If the consensus round is a preset checkpoint round, the first voting result further includes a transaction execution result generated by the target node for the target transaction.

After receiving the consensus proposal message from the master node, the target node first determines whether the first voting result set in the consensus proposal message includes checkpoint information. The checkpoint information is generated by the master node in each of the consensus rounds in the consensus round, and only when the previous consensus round is the checkpoint round, the master node in the current consensus round can generate the checkpoint information.

For example, the plurality of consensus rounds include a first consensus round and a second consensus round adjacent to each other, and the second consensus round is before the first consensus round. Only when the second consensus round is a preset checkpoint round, the master node in the first consensus round can generate the checkpoint information in the first consensus round. Meanwhile, if the master node is in the checkpoint round, each of the plurality of nodes in the blockchain may generate a transaction execution result for the target transaction.

If the target node determines that the first voting result set includes the checkpoint information, the target node needs to determine whether the local target transaction execution result generated by the target node for the target transaction is consistent with the transaction execution results in the first voting result set.

If the target node determined that the local target transaction execution result is consistent with the transaction execution result in the first voting result set, it can be determined that the local target node execution result is consistent with the execution result of the entire network. That is, the target node reaches the consensus on the target transaction. In other words, the target node achieves transaction sequence consistency and state consistency on the target transaction.

If the target node determines that the target node local execution result is inconsistent with the execution result of the entire network, the target node waits for timeout with respect to the consensus.

In the embodiment shown in FIG. 5, if the target transaction is executed on the blockchain, the blockchain is in the first consensus round, and there is no first voting result set of the previous consensus round. In this case, after receiving the consensus proposal message from the master node, the target node can directly determine whether the target node is in a specific checkpoint round, and no longer determine whether the first voting result set includes the checkpoint information. Alternatively, it may be said that, since there is no first voting result set of the previous consensus round, the first voting result set does not include the checkpoint information.

If the first voting result set does not include the checkpoint information or the target node has reached the consensus on the target transaction, the target node further needs to determine whether the target node is in the specific checkpoint round. If the target node is in the specific checkpoint round, it is necessary for the target node to wait for the transaction execution result generated by the latest block in the blockchain for the target transaction until the current consensus round. That is, the transaction execution result generated for the target transaction can be generated for the first consensus proposal block.

The target node then votes for the master node. That is, the target node transmits the first result voting information including the transaction execution result to the master node in the current consensus round. If the master node determines that it is not in the specific checkpoint round, the target node directly votes for the master node.

After the master node in the current consensus round receives a first preset amount of the first voting information from the target node, the master node needs to determine whether the previous consensus round before the current consensus round is a preset checkpoint round. If the previous consensus round is the checkpoint round, the master node needs to aggregate a first voting information set including checkpoint information. If the previous consensus round is not the checkpoint round, the master node aggregates the first voting information set that does not include the checkpoint information, and waits for timeout with respect to the consensus.

In FIG. 5, when the master node aggregates the first voting information set including the checkpoint information, the master node actually determines whether a second preset number of transaction execution results are consistent. If the second preset number of transaction execution results are consistent, the master node may aggregate the first voting information set including the checkpoint information.

After the master node aggregates the first voting information set including the checkpoint information, the master node further needs to determine whether the transaction execution result generated by the master node for the target transaction is consistent with the transaction execution results in the first voting result set including the checkpoint information. If the transaction execution result generated by the master node for the target transaction is consistent with the transaction execution results in the first voting result set including the checkpoint information, it can be considered that the master node achieves the transaction sequence consistency and the state consistency for the target transaction. That is, all nodes in the blockchain reach the consensus for the target transaction. A new consensus round can be restarted.

In FIG. 5, if the master node determines that the local transaction execution result is inconsistent with the transaction execution result in the first voting result set including the checkpoint information, the master node waits for timeout with respect to the consensus.

In FIG. 5, after waiting for timeout with respect to the consensus, the blockchain can enter a process of switching the master node to elect a new master node, and the new master node restarts to reach the consensus on the target transaction.

The present application further provides a consensus apparatus for blockchain, which is applied to the blockchain. The blockchain includes a plurality of nodes connected sequentially and is provided with a plurality of consensus rounds at runtime for performing a consensus on a transaction executed on the blockchain. A checkpoint round is included in the plurality of consensus rounds. The plurality of nodes includes a master node and a target node within one of the consensus rounds, where the target node is any node of the plurality of nodes except the master node. A consensus proposal message is generated for a target transaction after the target transaction is executed in the blockchain.

Figure 6:
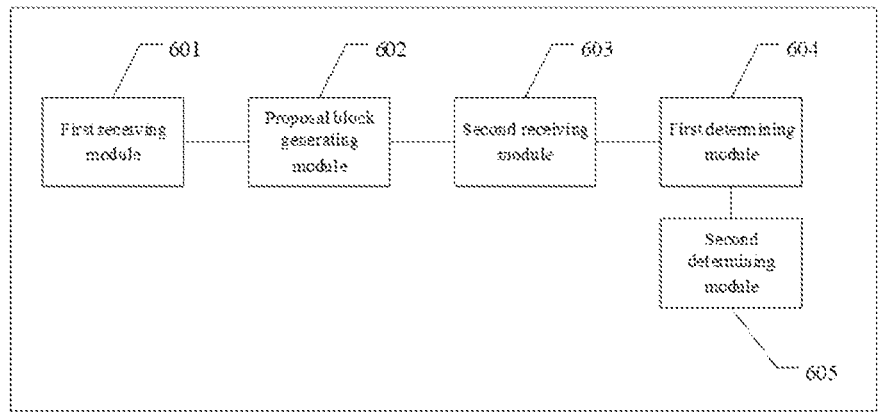
FIG. 6 is a schematic diagram of a consensus apparatus for blockchain provided in an embodiment of the present application.

In order to better implement the consensus method for blockchain in the embodiment of the present application, another embodiment of the present application further provides a consensus apparatus for blockchain on the basis of the consensus method for blockchain. As shown in FIG. 6, which is a schematic diagram of the consensus apparatus for blockchain provided in the embodiment of the present application. The consensus apparatus for blockchain may include:

a first receiving module 601 for, in a first consensus round of the plurality of consensus rounds, receiving a first voting result set generated by the plurality of nodes for the consensus proposal message in a second consensus round, where the second consensus round is a consensus round before the first consensus round;

a proposal block generating module 602 for, in the first consensus round, generating a first consensus proposal block for the consensus proposal message, where the consensus proposal message includes the first consensus proposal block, the first voting result set in the second consensus round, and the target transaction;

a second receiving module 603 for receiving a first voting result generated by the target node for the consensus proposal message;

a first determining module 604 for determining whether the second consensus round is the checkpoint round according to the first voting result; and a second determining module 605 for, if the second consensus round is the checkpoint round, determining whether the blockchain reaches a consensus on the target transaction according to the first voting result.

The present application provides the consensus apparatus for blockchain, which designs the checkpoint round without waiting for transaction execution results of all nodes in each consensus round so as to reduce the impact of transaction execution on the consensus and improve stability of the consensus. A block can be newly created, including an execution result and a state of a previous block of the newly created block of the blockchain, and thus only the consistency of the newly created block may be verified to avoid waste of memory resources and computing resources. The checkpoint round can be flexibly customized to improve scalability of the consensus algorithm.

In ye other embodiments of the present application, the first determining unit 604 may be mainly configured for: the master node determining whether a first preset number of first voting results are received by the master node; and if the first preset number of first voting results are received by the master node, the master node determining that the second consensus round is the checkpoint round.

In yet other embodiments of the present application, if the second consensus round is the checkpoint round, the target node generates a transaction execution result corresponding to the target transaction in the second consensus round, the first voting result set generated in the second consensus round includes the transaction execution result, and a plurality of transaction execution results in the first voting result set are generated in the second consensus round.

Figure 7:
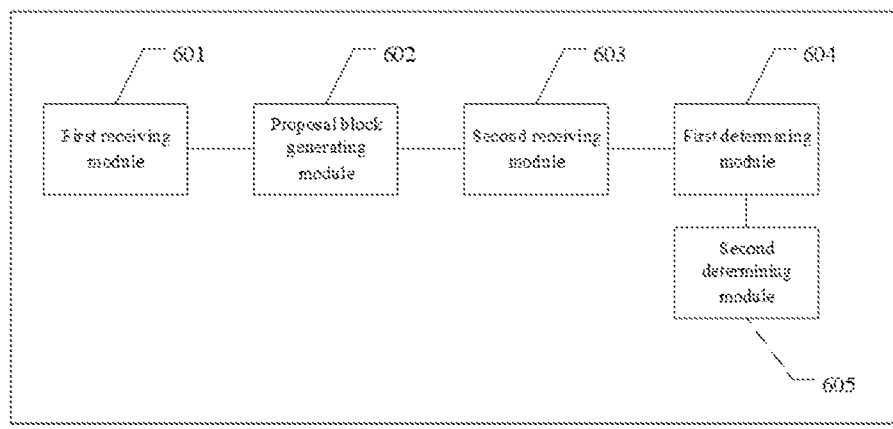
FIG. 7 is a schematic diagram of another consensus apparatus for blockchain provided in another embodiment of the present application.

The second determining unit 605 can be mainly configured for: if the second consensus round is the checkpoint round, the master node determining whether the plurality of transaction execution results in the first voting result set generated in the second consensus round are consistent; if the transaction execution results of a second preset number of nodes are consistent, the master node generating and aggregating checkpoint information in the first voting result set generated in the second consensus round; the master node determining whether the transaction execution result generated by the master node according to the target transaction is consistent with the transaction execution results in the first voting result set generated in the second consensus round; and if the transaction execution result generated by the master node according to the target transaction is consistent with the transaction execution results in the first voting result set generated in the second consensus round, determining that the blockchain reaches the consensus on the target transaction In order to better implement the consensus method for blockchain in the embodiment of the present application, another embodiment of the present application further provides a consensus apparatus for blockchain on the basis of the consensus method for blockchain. As shown in FIG. 7, which is a schematic diagram of the consensus apparatus for blockchain provided in another embodiment of the present application. The consensus apparatus for blockchain is applied to the blockchain. The blockchain includes a plurality of nodes connected sequentially and is provided with a plurality of consensus rounds at runtime for performing a consensus on a transaction executed on the blockchain. A checkpoint round is included in the plurality of consensus rounds. The plurality of nodes includes a master node and a target node within one of the consensus rounds, where the target node is any node of the plurality of nodes except the master node. A consensus proposal message is generated for a target transaction after the target transaction is executed in the blockchain.

As shown in FIG. 7, the consensus apparatus for blockchain may include:

a third receiving module 701 for, in a first consensus round of the plurality of consensus rounds, receiving a consensus proposal message from the master node, where the consensus proposal message includes a first voting result set generated by the plurality of nodes for the consensus proposal message in a second consensus round and the second consensus round is a consensus round before the first consensus round;

a third determining module 702 for determining whether the first consensus round in which the target node is located is the checkpoint round;

an obtaining module for 703, if the first consensus round is the checkpoint round, obtaining a transaction execution result corresponding to the target transaction, where the transaction execution result is encapsulated in the first voting result generated by the target node in the first consensus round; and a transmitting module 704 for transmitting the first voting result including the transaction execution result to the master node.

The present application provides the consensus apparatus for blockchain, which can design the checkpoint round without waiting for transaction execution results of all nodes in each consensus round so as to reduce the impact of transaction execution on the consensus and improve stability of the consensus. The checkpoint round can be flexibly customized to improve scalability of the consensus algorithm.

Figure 8:
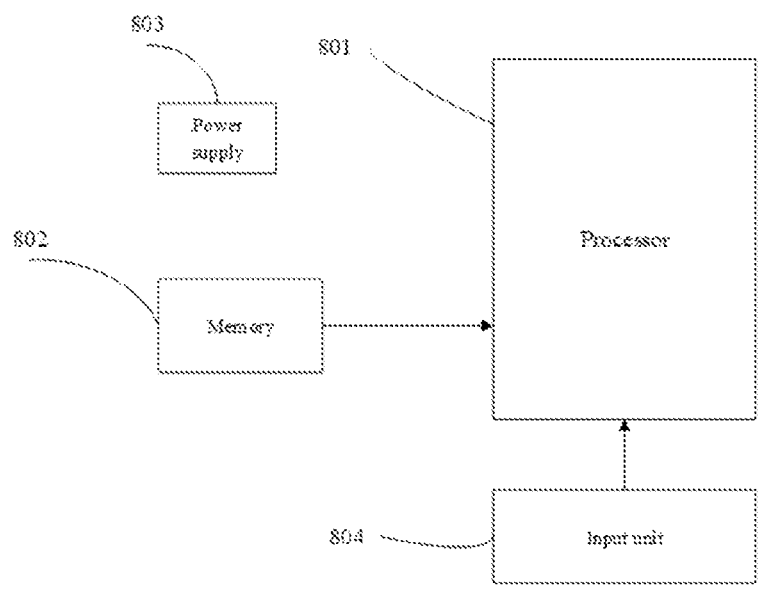
FIG. 8 shows a schematic structural diagram of a server according to an embodiment of the present application.

The present application also provides a server that integrates the consensus apparatus for blockchain provided in any of the embodiments of the present application. As shown in FIG. 8, which shows a schematic structural diagram of the server according to the embodiment of the present application.

Specifically, the server may include components such as a processor 801 of one or more processing cores, a memory 802 of one or more computer-readable storage media, a power supply 803, and an input unit 804. It will be understood by those skilled in the art that the structure of the server shown in FIG. 8 is not intended to limit the server, and may include more or fewer components than shown, or some combination of components, or different arrangements of components.

The processor 801 functions as a control center of the server and is configured to connect each component of the server using various interfaces and circuits, and is configured to execute the various functions of the server and to perform data processing by running or executing the software programs and/or modules stored in the memory 802 and calling the data stored in the memory 802, thereby monitoring the server. Alternatively, the processor 801 may include one or more processing cores. Preferably, the processor 801 may integrate an application processor and a modem processor, where the application processor mainly processes an operating system, a user interface, an application program, and the like, and the modem processor mainly processes wireless communication. It should be understood that the modulation/demodulation processor can be independent from the processor 801.

The memory 802 may be used to store software programs and modules, and the processor 801 executes various functional applications and data processing by running the software programs and modules stored in the memory 802. The memory 802 may mainly include a storage program area and a storage data area, where the storage program area may store an operating system, an application program (such as a sound play function, an image play function, and the like) required by at least one function, and the like; and the storage data area may store data or the like created according to the use of the server. In addition, memory 802 may include a high speed random access memory, and may also include a non-volatile memory, such as at least one magnetic disk storage device, a flash memory device, or other volatile solid state storage device. Accordingly, memory 802 may also include a memory controller to provide access to the memory 802 by the processor 801.

The server further includes a power supply 803 for supplying power to the respective components. Preferably, the power supply 803 may be logically connected to the processor 801 by the power supply management system, so that functions such as charging, discharging, and power consumption management are managed by the power supply management system. The power supply 803 may further include one or more direct current (DC)/or alternating current (AC) power sources, recharging system, power failure detection circuit, power converter or inverter, power supply status indicator, and the like.

The server may also include an input unit 804 operable to receive input numeric or character information and to generate a signal input of a keyboard, a mouse, a joystick, an optical or a trackball related to user settings and functional control.

Although not shown, the server may also include a display unit or the like, of which details are not repeatedly described herein. In the present embodiment, the processor 801 in the server may load executable files corresponding to processes of one or more application programs into the memory 802 according to the following instructions, and the processor 801 executes the application programs stored in the memory 802 to implement various functions including:

in a first consensus round of a plurality of consensus rounds, a master node receiving a first voting result set generated by the plurality of nodes for a consensus proposal message in a second consensus round, where the second consensus round is a consensus round before the first consensus round; in the first consensus round, the master node generating a first consensus proposal block for the consensus proposal message, where the consensus proposal message includes the first consensus proposal block, the first voting result set in the second consensus round, and the target transaction; the master node receiving a first voting result generated by a target node for the consensus proposal message; the master node determining whether the second consensus round is the checkpoint round according to the first voting result; and if the second consensus round is the checkpoint round, the master node determining whether the blockchain reaches a consensus on the target transaction according to the first voting result.

Alternatively, the processor 801 in the server may load executable files corresponding to processes of one or more application programs into the memory 802 according to the following instructions, and the processor 801 executes the application programs stored in the memory 802 to implement various functions including:

in a first consensus round of a plurality of consensus rounds, a target node receiving a consensus proposal message from a master node, where the consensus proposal message includes a first voting result set generated by the plurality of nodes for the consensus proposal message in a second consensus round and the second consensus round is a consensus round before the first consensus round; the target node determining whether the first consensus round in which the target node is located is the checkpoint round; if the first consensus round is the checkpoint round, the target node obtaining a transaction execution result corresponding to the target transaction, where the transaction execution result is encapsulated in the first voting result generated by the target node in the first consensus round; and the target node transmitting the first voting result including the transaction execution result to the master node.

The present application further provides a computer readable storage medium. The storage medium may include a Read Only Memory (ROM), a Random Access Memory (RAM), a magnetic disk, an optical disk, or the like. The storage medium stores a computer program that is loaded by a processor to perform steps of the consensus method for blockchain provided in any of embodiments of the present application. For example, the computer program may be loaded by the processor to perform the following steps:

in a first consensus round of a plurality of consensus rounds, a master node receiving a first voting result set generated by the plurality of nodes for a consensus proposal message in a second consensus round, where the second consensus round is a consensus round before the first consensus round; in the first consensus round, the master node generating a first consensus proposal block for the consensus proposal message, where the consensus proposal message includes the first consensus proposal block, the first voting result set in the second consensus round, and the target transaction; the master node receiving a first voting result generated by a target node for the consensus proposal message; the master node determining whether the second consensus round is the checkpoint round according to the first voting result; and if the second consensus round is the checkpoint round, the master node determining whether the blockchain reaches a consensus on the target transaction according to the first voting result.

Alternatively, the computer program may be loaded by the processor to perform the following steps:

in a first consensus round of a plurality of consensus rounds, a target node receiving a consensus proposal message from a master node, where the consensus proposal message includes a first voting result set generated by the plurality of nodes for the consensus proposal message in a second consensus round and the second consensus round is a consensus round before the first consensus round; the target node determining whether the first consensus round in which the target node is located is the checkpoint round; if the first consensus round is the checkpoint round, the target node obtaining a transaction execution result corresponding to the target transaction, where the transaction execution result is encapsulated in the first voting result generated by the target node in the first consensus round; and the target node transmitting the first voting result including the transaction execution result to the master node.

It should be noted that the method according to the embodiment of the present application is executed in an electronic device, and processing objects of the electronic device exist in the form of data or information. For example, time substantially indicates time information. It can be understood that, in the subsequent embodiments, if a size, number, position, or the like are mentioned, the data corresponding thereto exists for processing by the electronic device, and details thereof are not described herein.

The consensus method and apparatus for blockchain, the server, and the storage medium provided in the embodiments of the present application are described in detail above. A specific example is used herein to describe a principle and an implementation of the present application. The description of the foregoing embodiments is merely used to help understand a method and a core idea of the present application. In addition, a person skilled in the art may make changes in a specific implementation manner and an application scope according to an idea of the present application. In conclusion, content of this specification should not be construed as a limitation on the present application.

What is claimed is:

1. A consensus method for blockchain, wherein the blockchain comprises a plurality of nodes connected sequentially and is provided with a plurality of consensus rounds at runtime for performing a consensus on a transaction executed on the blockchain, a checkpoint round is included in the plurality of consensus rounds, the plurality of nodes comprise a master node and a target node within one of the consensus rounds, the target node is any of the plurality of nodes except the master node, a consensus proposal message is generated for a target transaction after the target transaction is executed in the blockchain, and each of the plurality of nodes corresponds to a terminal device as a hardware processor;

the method comprises: by the terminal device of the master node, in a first consensus round of the plurality of consensus rounds, the master node receiving a first voting result set generated by the plurality of nodes for the consensus proposal message in a second consensus round, wherein the second consensus round is a consensus round before the first consensus round;

in the first consensus round, the master node generating a first consensus proposal block for the consensus proposal message, wherein the consensus proposal message comprises the first consensus proposal block, the first voting result set in the second consensus round, and the target transaction;

the master node receiving a first voting result generated by the target node for the consensus proposal message;

the master node determining whether the second consensus round is the checkpoint round based on the first voting result; and in response to the second consensus round being the checkpoint round, the master node determining whether the blockchain reaches a consensus on the target transaction based on the first voting result, wherein the master node determining whether the second consensus round is the checkpoint round based on the first voting result comprises:

the master node determining whether a first preset number of first voting results are received by the master node; and in response to the first preset number of first voting results being received by the master node, the master node determining whether the second consensus round is the checkpoint round.

2. The method of claim 1, wherein the master node determining whether a first preset number of first voting results are received by the master node comprises:

in response to the master node receiving first voting results fed back by two-thirds of nodes in the blockchain, the master node determining whether the second consensus round is the checkpoint round.

3. The method of claim 1, wherein in response to the second consensus round being the checkpoint round, the target node generates a transaction execution result corresponding to the target transaction in the second consensus round, the first voting result set generated in the second consensus round comprises the transaction execution result, and there are a plurality of transaction execution results in the first voting result set generated in the second consensus round;

the master node determining whether the blockchain reaches the consensus on the target transaction based on the first voting result comprises:

in response to the second consensus round being the checkpoint round, the master node determining whether the plurality of transaction execution results in the first voting result set generated in the second consensus round are consistent;

in response to the transaction execution results of a second preset number of nodes being consistent, the master node generating and aggregating checkpoint information in the first voting result set generated in the second consensus round;

the master node determining whether the transaction execution result generated by the master node based on the target transaction is consistent with the transaction execution results in the first voting result set generated in the second consensus round; and in response to the transaction execution result generated by the master node being consistent with the transaction execution results in the first voting result set generated in the second consensus round, determining that the blockchain reaches the consensus on the target transaction.

4. The method of claim 3, wherein the master node determining whether the transaction execution result generated by the master node based on the target transaction is consistent with the transaction execution results in the first voting result set generated in the second consensus round comprises:

determining whether the transaction execution result generated by the master node is consistent with any of the transaction execution results in the first voting result set generated in the second consensus round.

5. The method of claim 3, further comprising:

in response to the transaction execution result generated by the master node being inconsistent with the transaction execution results in the first voting result set generated in the second consensus round, the master node waiting for timeout with respect to the consensus; and switching the master node to obtain a new master node, wherein the new master node reaches a consensus on the target transaction again.

6. The method of claim 5, wherein switching the master node comprises:
   numbering the plurality of nodes in the blockchain in an order, wherein a first node of the nodes in the order is an initial master node; and when the master node needs to be switched, switching the master node sequentially based on the order.
7. The method of claim 1, further comprising:
   in response to the second consensus round being not the checkpoint round, the master node re-aggregating first voting results generated by other nodes in the first consensus round to generate a second voting result set; and
   switching the master node to obtain a new master node, wherein the new master node reaches a consensus on the target transaction again.
8. The method of claim 7, further comprising:
   the new master node constructing a second proposal block based on the first proposal block, wherein the second proposal block comprises the second voting result set, the consensus proposal message, and the target transaction.
9. A consensus method for blockchain, wherein the blockchain comprises a plurality of nodes connected sequentially and is provided with a plurality of consensus rounds at runtime for performing a consensus on a transaction executed on the blockchain, a checkpoint round is included in the plurality of consensus rounds, the plurality of nodes comprise a master node and a target node within one of the consensus rounds, the target node is any of the plurality of nodes except the master node, a consensus proposal message is generated for a target transaction after the target transaction is executed in the blockchain, and each of the plurality of nodes corresponds to a terminal device as a hardware processor;
   the method comprises: by the terminal device of the target node,
   in a first consensus round of the plurality of consensus rounds, the target node receiving the consensus proposal message from the master node, wherein the consensus proposal message comprises a first voting result set generated by the plurality of nodes for the consensus proposal message in a second consensus round and the second consensus round is a consensus round before the first consensus round;
   the target node determining whether the first consensus round in which the target node is located is the checkpoint round;
   in response to the first consensus round being the checkpoint round, the target node obtaining a transaction execution result corresponding to the target transaction, wherein the transaction execution result is encapsulated in the first voting result generated by the target node in the first consensus round; and
   the target node transmitting the first voting result comprising the transaction execution result to the master node.
10. The method of claim 9, further comprising: before the target node determining whether the first consensus round in which the target node is located is the checkpoint round,
   the target node determining whether the consensus proposal message includes checkpoint information; and
   in response to the consensus proposal message including the checkpoint information, the target node determining whether the target node reaches a consensus on the target transaction based on the checkpoint information.
11. The method of claim 10, further comprising:
   in response to the first consensus round being not the checkpoint round, the target node generating and transmitting a first voting result for the consensus proposal message to the master node,
   wherein the first voting result does not comprise a transaction execution result obtained by the target node for the target transaction.
12. A non-transitory computer readable storage medium having stored thereon a computer program that is loaded by a processor to perform operations comprising: wherein the blockchain comprises a plurality of nodes connected sequentially and is provided with a plurality of consensus rounds at runtime for performing a consensus on a transaction executed on the blockchain, a checkpoint round is included in the plurality of consensus rounds, the plurality of nodes comprise a master node and a target node within one of the consensus rounds, the target node is any of the plurality of nodes except the master node, and a consensus proposal message is generated for a target transaction after the target transaction is executed in the blockchain,
   in a first consensus round of the plurality of consensus rounds, the master node receiving a first voting result set generated by the plurality of nodes for the consensus proposal message in a second consensus round, wherein the second consensus round is a consensus round before the first consensus round;
   in the first consensus round, the master node generating a first consensus proposal block for the consensus proposal message, wherein the consensus proposal message comprises the first consensus proposal block, the first voting result set in the second consensus round, and the target transaction;
   the master node receiving a first voting result generated by the target node for the consensus proposal message;
   the master node determining whether the second consensus round is the checkpoint round based on the first voting result; and
   in response to the second consensus round being the checkpoint round, the master node determining whether the blockchain reaches a consensus on the target transaction based on the first voting result,
   wherein the master node determining whether the second consensus round is the checkpoint round based on the first voting result comprises:
   the master node determining whether a first preset number of first voting results are received by the master node; and
   in response to the first preset number of first voting results being received by the master node, the master node determining whether the second consensus round is the checkpoint round.
13. The storage medium of claim 12, wherein the master node determining whether a first preset number of first voting results are received by the master node comprises:
   in response to the master node receiving first voting results fed back by two-thirds of nodes in the blockchain, the master node determining whether the second consensus round is the checkpoint round.
14. The storage medium of claim 12, wherein in response to the second consensus round being the checkpoint round, the target node generates a transaction execution result corresponding to the target transaction in the second consensus round, the first voting result set generated in the second consensus round comprises the transaction execution result, and there are a plurality of transaction execution results in the first voting result set generated in the second consensus round;

the master node determining whether the blockchain reaches the consensus on the target transaction based on the first voting result comprises:

in response to the second consensus round being the checkpoint round, the master node determining whether the plurality of transaction execution results in the first voting result set generated in the second consensus round are consistent;

in response to the transaction execution results of a second preset number of nodes being consistent, the master node generating and aggregating checkpoint information in the first voting result set generated in the second consensus round;

the master node determining whether the transaction execution result generated by the master node based on the target transaction is consistent with the transaction execution results in the first voting result set generated in the second consensus round; and in response to the transaction execution result generated by the master node being consistent with the transaction execution results in the first voting result set generated in the second consensus round, determining that the blockchain reaches the consensus on the target transaction.

15. The storage medium of claim 14, wherein the master node determining whether the transaction execution result generated by the master node based on the target transaction is consistent with the transaction execution results in the first voting result set generated in the second consensus round comprises:

determining whether the transaction execution result generated by the master node is consistent with any of the transaction execution results in the first voting result set generated in the second consensus round.

16. The storage medium of claim 14, wherein the computer program is further loaded by the processor to perform operations:

in response to the transaction execution result generated by the master node being inconsistent with the transaction execution results in the first voting result set generated in the second consensus round, the master node waiting for timeout with respect to the consensus; and switching the master node to obtain a new master node, wherein the new master node reaches a consensus on the target transaction again.

17. The storage medium of claim 16, wherein switching the master node comprises:

numbering the plurality of nodes in the blockchain in an order, wherein a first node of the nodes in the order is an initial master node; and when the master node needs to be switched, switching the master node sequentially based on the order.

18. The storage medium of claim 12, wherein the computer program is further loaded by the processor to perform operations:

in response to the second consensus round being not the checkpoint round, the master node re-aggregating first voting results generated by other nodes in the first consensus round to generate a second voting result set; and switching the master node to obtain a new master node, wherein the new master node reaches a consensus on the target transaction again.

\* \* \* \* \*